United States Patent [19]

Petros

[11] 4,437,223
[45] Mar. 20, 1984

[54] APPARATUS FOR DEBANDING COILED STRIP

[75] Inventor: Andrew J. Petros, Oakdale, Pa.

[73] Assignee: Mesta Machine Company, Pittsburgh, Pa.

[21] Appl. No.: 354,968

[22] Filed: Mar. 5, 1982

[51] Int. Cl.³ .......................... B23P 23/00; B23C 1/00
[52] U.S. Cl. .................................... 29/564.3; 29/56.5; 83/909; 83/924
[58] Field of Search .................. 414/412; 83/909, 924, 83/614, 105.19; 29/564.3, 56.5

[56] References Cited

U.S. PATENT DOCUMENTS

| | | | |
|---|---|---|---|
| 3,377,687 | 4/1968 | De Chellis | 83/105 |
| 3,521,347 | 6/1970 | Bentley | 29/564.3 |
| 3,557,591 | 1/1971 | Lind | 29/564.3 |
| 4,205,419 | 6/1980 | Aoshima | 29/56.5 |
| 4,219,914 | 9/1980 | Bartzick et al. | 29/56.5 |
| 4,250,783 | 2/1981 | Ogle | 29/564.3 |
| 4,328,609 | 5/1982 | Born | 29/564.3 |
| 4,370,796 | 2/1983 | Wilson | 29/564.3 |
| 4,387,493 | 6/1983 | Nakaie | 29/56.5 |

Primary Examiner—Howard N. Goldberg
Assistant Examiner—Steven E. Nichols
Attorney, Agent, or Firm—Carothers and Carothers

[57] ABSTRACT

Removal of tightly encircling bands from coiled strips is accomplished by transversely engaging a spaced pair of pinch rolls against the band on a coil and then severing the band therebetween and moving one pinch roll into engagement with the other pinch roll to pinch the severed band end therebetween, and at least one roll is driven to feed the pinched band outwardly away from the coil into a scrap chopper. The device used for severing the band is provided with a band shear which is movable along a track that runs transverse to the band. The shear is driven along the track to lodge a sharp leading edge thereof under the band and the shear is then actuated to sever the band, and thereafter the band severing means is removed from between the pinch rolls.

17 Claims, 6 Drawing Figures

APPARATUS FOR DEBANDING COILED STRIP

BACKGROUND OF THE INVENTION

The present invention relates to apparatus for automatically removing a band from a coil of strip, such as metallic strip, preparatory to the leading end thereof being fed into a coil processing apparatus.

In the processing of metallic coils of strip, say for example, in a cold reduction mill, it is customary to band the coils of metal strip after initial processing so that they are self contained for the necessary storage and handling prior to further processing. The coils are thus brought into the mill with a band tightly secured around their outer peripheries, which must be removed before the coil can be uncoiled. In the past, band removal for subsequent processing has generally been assigned as a manual operation for a person to perform before the coil is unwrapped. In some instances, attempts have been made to automate this operation, as may be seen for example in U.S. Pat. No. 3,377,687 issued on Apr. 16, 1968 to R. C. DeChellis for Debanding Device for Rolled Coils. However, automatic debanders in general have not been reliable, as they do not have reliable methods of automatically locating the band on the coil, means for always insuring that the band has been cut, and a reliable means of feeding the band into a scrap band chopper.

It is a principal object of the present invention to provide a coil band cutter, removal and disposal apparatus and method which is completely reliable and completely automated, and is further devoid of the problems encountered in the prior art. The method and apparatus of the present invention automates the band removal operation and provides a positive method of finding, cutting, gripping and feeding the band into a scrap chopper for a convenient method of disposal.

SUMMARY OF THE INVENTION

The automatic apparatus of the present invention for removing tightly encircling bands from the peripheries of coils of material generally comprises a support for supporting a banded coil, a frame having a first pinch roll transversely engageable with a band on the coil, a band severing device adjacent one side of the pinch roll which includes a cutting instrument for severing the band, and another pinch means or device on the same frame which is movable into engagement with the aforesaid first pinch roll from the side thereof where the band was severed to pinch the severed band end between this pinch means and the first pinch roll. The pinch roll is then rotatably driven such that the band pinched between the pinch roll and the pinch means is fed outwardly away from the coil. Generally, the band is fed into a scrap chopper to chop the band up into segments.

Prior to driving the pinch roll to feed the pinched band into a chopper, the frame may be first displaced away from the coil pulling the pinched end of the band with it.

In the most convenient form, the pinch means which engages the first pinch roll will generally be provided in the form of a second pinch roll, which is rolled over the banded coil into engagement with the first pinch roll after the band has been severed, the point of sever being initially intermediate the two pinch rolls. The second pinch roll may also be provided with a guide ramp for guiding a severed end of the band up between the first and second pinch rolls for pinching therebetween when the second pinch roll is being driven into engagement with the first pinch roll.

The band severing means includes a frame having a band shear which is movable along a track that runs transverse to the band on the banded coil. The band shear further has a sharp leading edge for transversely wedging under the band on the banded coil. Motor means is provided on the frame to position the shear on the peripheral surface of the coil, and then the shear is driven along the track to lodge the sharp leading edge of the shear under the band and the shear is then actuated to sever the band. The shear is thereafter automatically retracted from between the pinch rolls and the aforedescribed end pinching operation of the band is carried out.

BRIEF DESCRIPTION OF THE DRAWINGS

Other objects and advantages appear in the following description and claims.

The accompanying drawings show, for the purpose of exemplification without limiting the invention or the claims thereto, certain practical embodiments illustrating the principles of this invention wherein:

DETAILED DESCRIPTION OF THE PREFERRED EMBODIMENT

Figure 1:
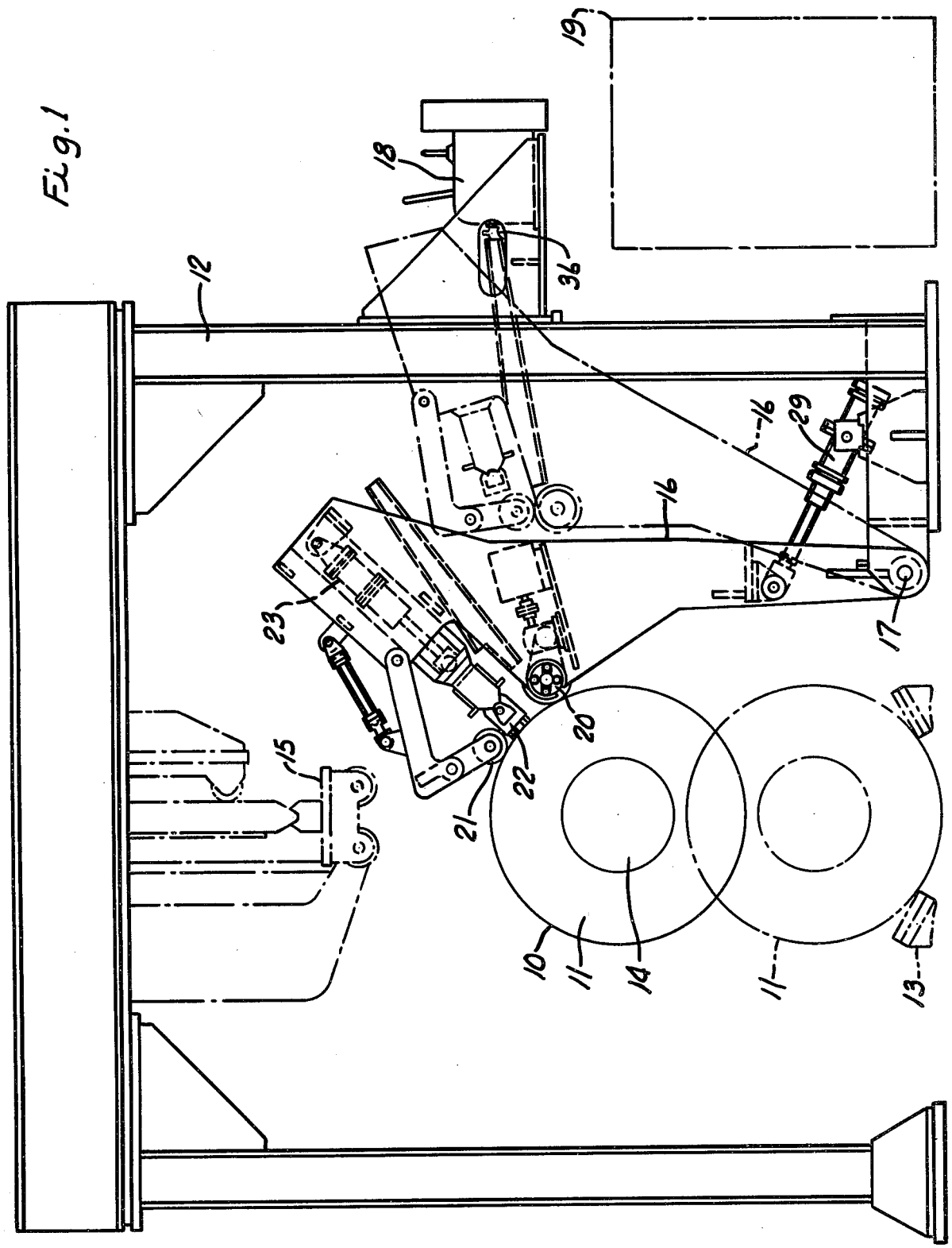
FIG. 1 is a view in side elevation of the automatic coil band cutter, removal and disposal apparatus of the present invention.

Referring to FIG. 1, the apparatus of the present invention for automatically cutting, removing and disposing of a band 10 tightly encircling the peripheries of metallic rolled strip in the form of coil 11 is illustrated. Coiled strip 11 is conveyed by conventional conveyor means into the coil preparation station indicated generally by reference numeral 12, which is a four-legged steel frame structure for preparation of the coil prior to entry of the lead end of the coil strip into a cold reduction mill or some other strip processing arrangement.

The coiled strip 11 is initially conveyed from the side into station 12 and it is raised by coil cradle lift 13 into position for reception or mounting on expandable mandrel 14. After coil 11 has been mounted on mandrel 14, the diameter thereof is detected and the strip end of the coil is detected by an apparatus generally indicated at 15, and the leading end of the coil is properly positioned for entry into the next processing step for the coiled strip. At this point in coil preparation, the coil 11 is stationary on mandrel 14 and the band 10 tightly encircling the peripheries of coil 11 is ready for cutting, removal and disposal by the automatic debanding apparatus of the present invention. The automatic debanding apparatus of the present invention is supported by frame 16 which pivots about axis 17. Frame 16 in FIG. 1 as illustrated in full line is indicated in the ready position to sever and remove band 10 from coiled strip 11. Frame 16 together with the band severing and removal apparatus is also illustrated in its retracted position in chain outline, after being pivoted clockwise about pivot 17, having severed and removed band 10 from coil 11 to feed the severed band 10 into a conventional scrap chopper indicated at 18, which cuts the band 10 up into small segments and disposes them thereunder into scrap bucket 19. Band or scrap chopper 18 is a conventional machine readily found on the market, such as is sold by Jeddeloh Brothers Sweed Mills, Inc.

Frame 16 is provided with substantially parallel first and second pinch rolls 20 and 21 respectively, which are spaced from each other and transversely engage band 10 which encircles banded coil 11. Pinch rolls 20 and 21 are maintained in engagement under pressure with band 10 against coil 11 by means of hydraulic cylinder 29 which pivotally advances and retracts frame 16 about pivot 17.

Figure 2:
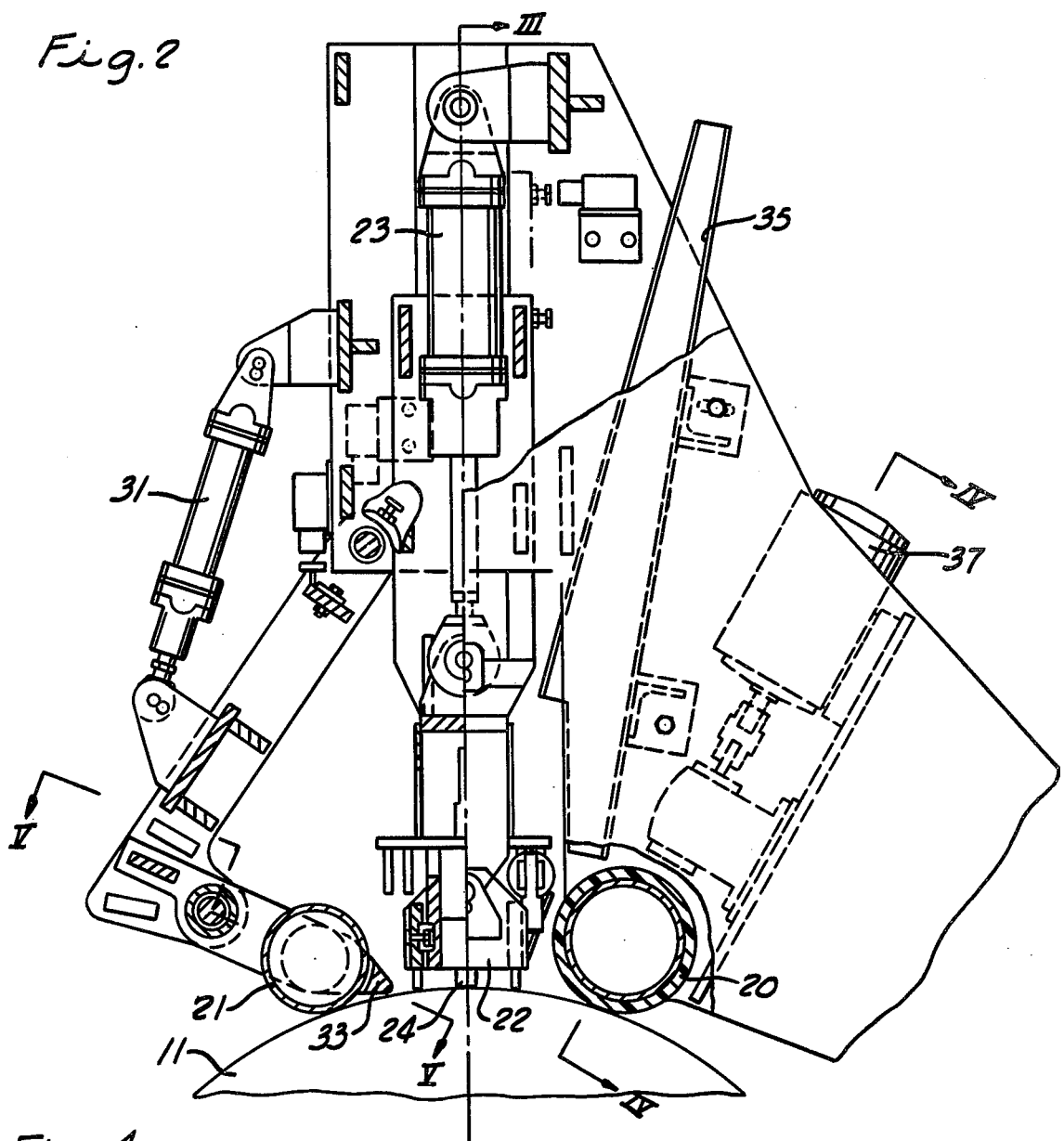
FIG. 2 is an enlarged view in side elevation illustrating the band cutter and removal portion of the apparatus shown in FIG. 1.

In FIG. 1, the solid outline of the band severing and removal apparatus supported by frame 16 illustrates the apparatus in position ready for band severing. In this position, band severing assembly 22 is lowered by pneumatic cylinder 23 to engage the outer surface of coil 11 intermediate or between pinch rolls 20 and 21. An enlargement of this configuration is shown in FIG. 2.

Figure 3:
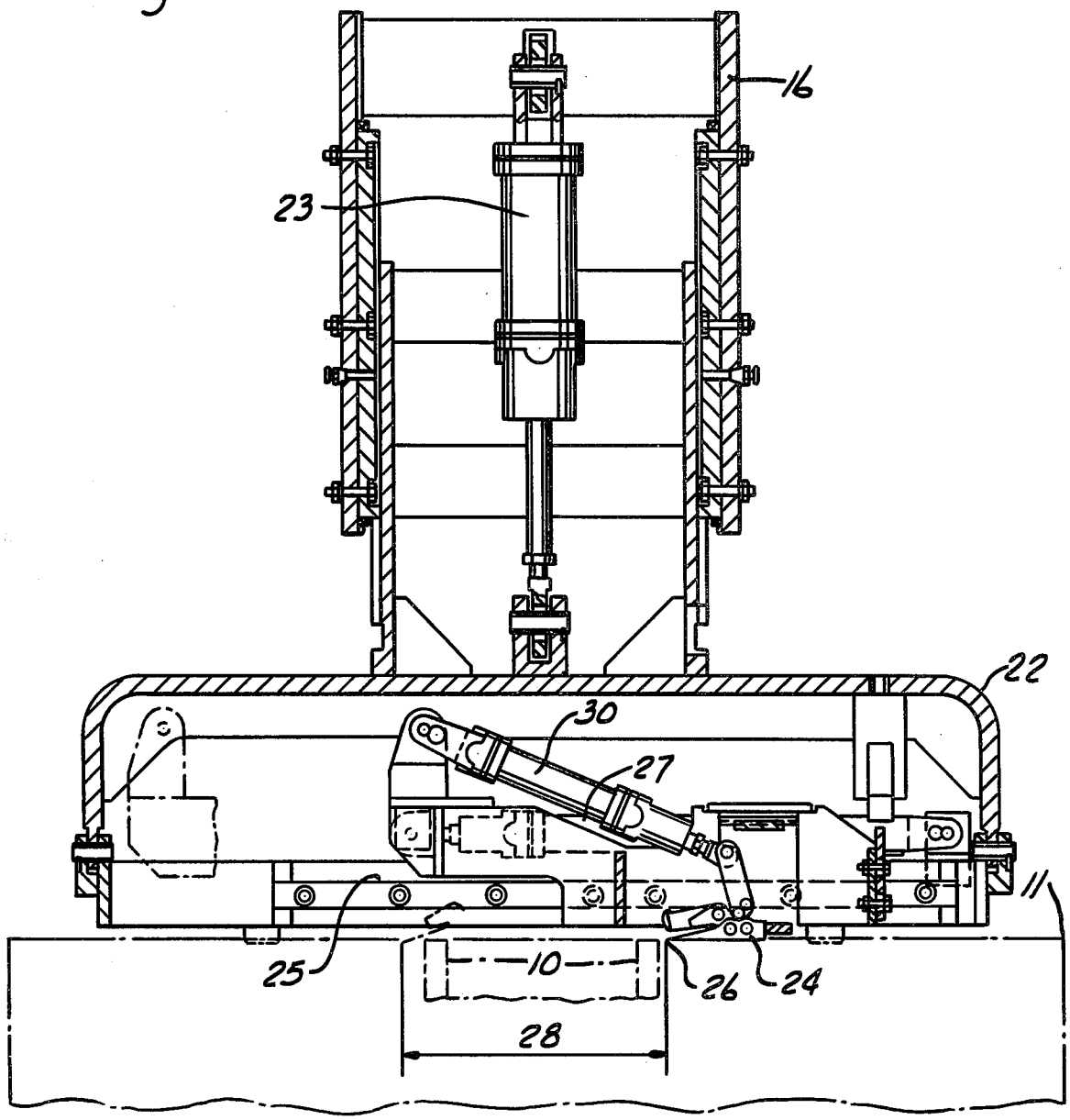
FIG. 3 is a view in vertical cross section of the apparatus illustrated in FIG. 2 and as seen along section line III—III.

After the band cutter or severing assembly 22 has been lowered to the down position to contact coil 11, the band cutter 24 is actuated to engage the band and sever it. Band severing means or assembly 22 generally includes a framework having a band cutter or shear 24 movable along track 25 which runs transversely of band 10. In this regard, reference is to FIG. 3. Band shear 24 is provided with a sharp leading edge 26 for transversely wedging under band 10.

Hydraulic cylinder 27 is operable to drive shear 24 transversely along track 25 to lodge the sharp leading edge 26 under band 10. This accurately locates band 10 and properly positions shear 24 for shearing band 10 anywhere within the maximum travel distance 28 of shear 24. Once shear 24 has engaged band 10 and the leading edge 26 is lodged thereunder, cylinder 30 is actuated thereby operating shear 24 and thus causing the top cutter blade of shear 24 to come down and shear band 10. Thereafter, the entire band severing assembly 22 is raised away from coil 11 by actuation of pneumatic cylinder 23.

As the band 10 is cut, band tension is released. However, the band is held tightly against the coil outside diameter by pinch rolls 20 and 21, and particularly pinch roll 20, through the pressure applied by hydraulic cylinder 29, to prevent the band from flying wildly.

Figure 6:
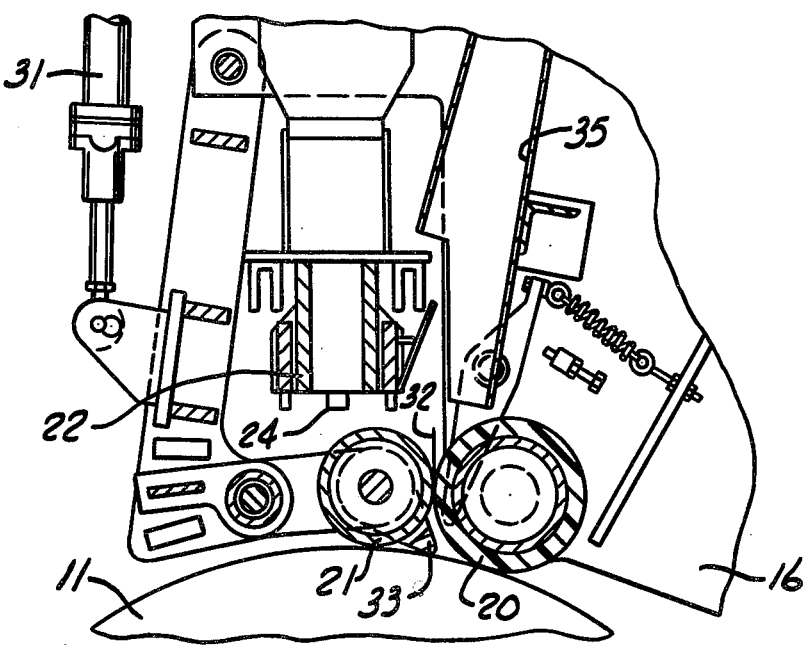
FIG. 6 is an enlarged view in side elevation illustrating the apparatus as shown in FIG. 2 with the band cutter retracted and the pinch rolls snubbed together with a severed band end pinched therebetween preparatory to feeding the band into a scrap chopper.

After the band cutter assembly 22 has been raised, as shown in the enlargement in FIG. 6, hydraulic cylinder 31 is actuated, thereby causing pinch roll 21 to roll over the surface of coil 11 under pressure toward pinch roll 20 until pinch roll 21 engages pinch roll 20 with the cut band end 32 pinched therebetween.

Figure 5:
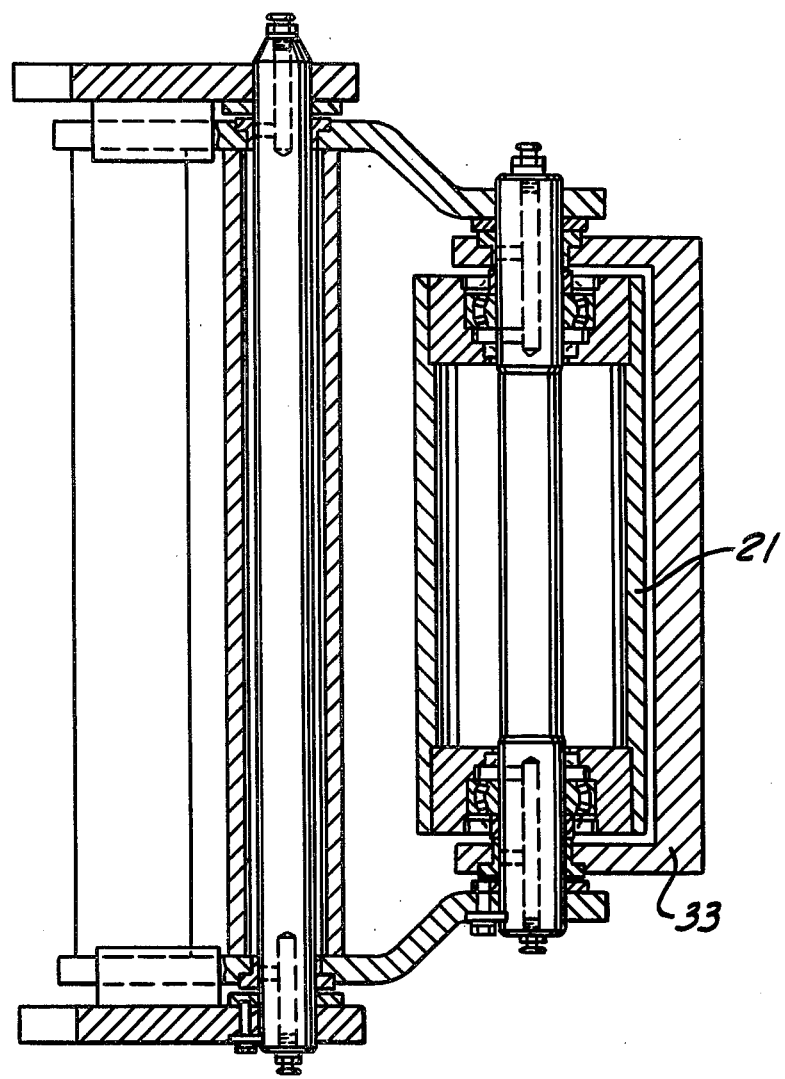
FIG. 5 is a sectional view of the other pinch roll or snub roll illustrated in the apparatus of FIG. 2 as seen along section line V—V.

As top pinch roll 21 advances toward bottom pinch roll 20, the sharp edge piece or guide ramp 33 (see FIG. 5 also) attached to the framework for pinch roll 21, moves under the severed end 32 of the band and the band is captured between the top and bottom pinch rolls 21 and 20, as best illustrated in FIG. 6, such that the band end 32 is directed toward the funnel chute 35. At this point in the operation, pivot arm or frame 16 together with the captured lead end 32 of band 10 is rotated away from coil 11 about pivot 17 by hydraulic cylinder 29 to the park position illustrated by chain outline in FIG. 1. In this position, funnel chute 35 is properly aligned with the mouth 36 of chopper 18 in order to feed band 10 therein.

Figure 4:
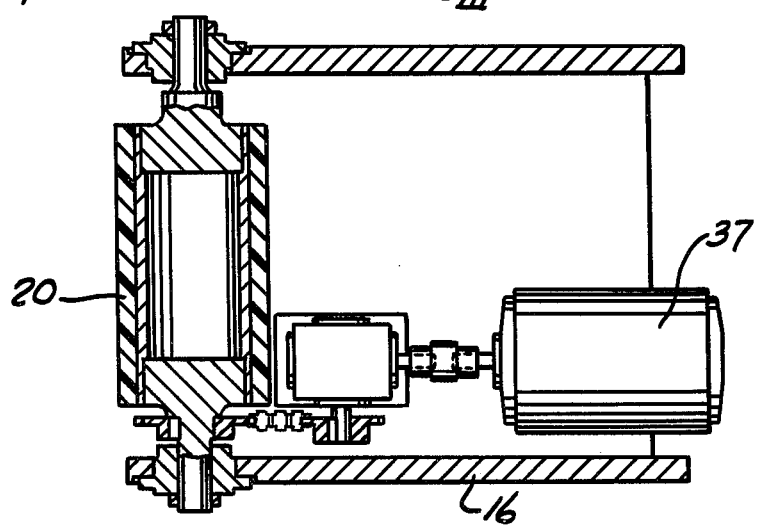
FIG. 4 is a sectional view of the pinch roll and pinch roll drive assembly portion of the apparatus illustrated in FIG. 2 as seen along section line IV—IV.

In this park position as illustrated by chain outline in FIG. 1, the bottom pinch roll 20 is driven by drive motor 37 (see also FIG. 4) to feed the cut end 32 of band 10 into chute 35 and thence into chopper 18, wherein band 10 is severed into small segments which are deposited thereunder in scrap bucket 19.

I claim:

1. An apparatus for removing tightly encircling bands from the peripheries of coils of material, such as, coils of metallic rolled strip comprising:
   support means for supporting a banded coil,
   a frame having a first pinch roll transversely engageable with a band on a banded coil supported on said support means,
   band severing means adjacent one side of said roll and including a cutting instrument with means for causing said cutting instrument to engage the band and sever it,
   pinch means on said frame movable into engagement with said roll from said one side to pinch a severed band end therebetween, and
   rotary drive means to rotate said roll such that a band pinched between said roll and said pinch means is fed outwardly away from a coil from which the band was severed.

2. An apparatus according to claim 1, wherein said pinch means includes a second pinch roll which is also transversely engageable with the band on a banded coil with said band severing means intermediate said first and second pinch rolls, means for displacing said band severing means away from a banded coil after the band thereabout has been severed while maintaining pressure against the band on opposite sides of the sever with said pinch rolls, and motor means to roll said second pinch roll into engagement with said first pinch roll with a severed band end pinched therebetween.

3. An apparatus according to claim 2, wherein said second pinch roll includes guide ramp means for guiding a severed end of a band up between said first and second pinch rolls for pinching therebetween when said second pinch roll is being driven into engagement with said first pinch roll.

4. An apparatus according to claim 1, wherein said band severing means includes a frame having a band shear movable along a track running transverse to a band on a banded coil, said band shear having a sharp leading edge for transversely wedging under a band on a banded coil, means for moving said frame such that said shear engages a peripheral surface of a banded coil, means for driving said shear along said track to lodge said sharp leading edge under a band, and means for actuating said shear.

5. An apparatus according to claim 1, including a band chopper, and funnel chute means to guide a band being fed from between said roll and said pinch means into said chopper for chopping a band into segments.

6. An apparatus according to claim 5, said funnel chute means mounted on said frame, means to displace said frame with said pinch roll and said pinch means from a coil with a band end pinched therebetween and thereby aligning said chute means with said chopper for guiding the feed of a band into said chopper.

7. An apparatus for removing tightly encircling bands from the peripheries of coils of material, such as, coils of metallic rolled strip comprising,
   support means for supporting a banded coil,
   a frame having substantially parallel first and second pinch rolls transversely engageable with a band encircled on a banded coil which is supported on said support means,
   band severing means positioned intermediate said first and second pinch rolls and including cutting means to engage and sever a band on a banded coil intermediate said pinch rolls,
   means for displacing said band severing means from between said pinch rolls after severence of a band,
   drive means for rollingly driving one of said pinch rolls into engagement with the other for pinching a severed band end therebetween, and
   rotary drive means to rotate at least one of said rolls such that a band end pinched between said pinch rolls is fed outwardly away from a roll from which the band was severed.

8. An apparatus according to claim 7, wherein said one pinch roll includes guide ramp means for guiding a severed end of a band up between said first and second pinch rolls for pinching therebetween when said one pinch roll is being driven into engagement with the other pinch roll.

9. An apparatus according to claim 7, wherein said band severing means includes a frame having a band shear movable along a track running transverse to a band on a banded coil, said band shear having a sharp leading edge for transversely wedging under a band on a banded coil, means for moving said frame such that said shear engages a peripheral surface of a banded coil, means for driving said shear along said track to lodge said sharp leading edge under a band, and means for actuating said shear.

10. An apparatus according to claim 7, including a band chopper, and funnel chute means to guide a band being fed from between said pinch rolls into said chopper for chopping a band into segments.

11. An apparatus according to claim 10, said funnel chute means mounted on said frame, means to displace said frame with said pinch rolls from a coil with a band end pinched therebetween and thereby aligning said chute means with said chopper for guiding the feed of a band into said chopper.

12. A band severing apparatus for severing tightly encircling bands from the peripheries of coils of material, such as, coils of metallic rolled strip comprising:
    a band cutter assembly including a band shear movable along a track running transverse to a band on a banded coil,
    said band shear having a sharp leading edge for transversely wedging under a band on a banded coil,
    means for moving said assembly such that said shear engages a peripheral surface of a banded coil,
    means for driving said shear along said track to lodge said sharp leading edge under a band, and
    means for actuating said shear.

13. An apparatus according to claim 12, including; a frame carrying said band cutter assembly, said means for moving said assembly, a first pinch roll transversely engageable with a band on a banded coil on one side of said band cutter assembly and pinch means on the other side of said band movable into engagement with said first pinch roll to pinch a severed band end therebetween; and rotary drive means to rotate said roll such that a band pinched between said roll and said pinch means is fed outwardly away from a coil from which the band was severed.

14. An apparatus according to claim 13, wherein said pinch means includes a second pinch roll which is also transversely engageable with the band on a banded coil with said band severing means intermediate said first and second pinch rolls, means for displacing said band severing means away from a banded coil after the band thereabout has been severed while maintaining pressure against the band on opposite sides of the sever with said pinch rolls, and motor means to roll said second pinch roll into engagement with said first pinch roll with a severed band end pinched therebetween.

15. An apparatus according to claim 14, wherein said second pinch roll includes guide ramp means for guiding a severed end of a band up between said first and second pinch rolls for pinching therebetween when said second pinch roll is being driven into engagement with said first pinch roll.

16. An apparatus according to claim 14, including a band chopper, and funnel chute means to guide a band being fed from between said roll and said pinch means into said chopper for chopping a band into segments.

17. An apparatus according to claim 16, said funnel chute means mounted on said frame, means to displace said frame with said pinch roll and said pinch means from a coil with a band end pinched therebetween and thereby aligning said chute means with said chopper for guiding the feed of a band into said chopper.

* * * * *